US012792450B2

(12) United States Patent
Koren et al.

(10) Patent No.: US 12,792,450 B2
(45) Date of Patent: *Nov. 10, 2026

(54) CONTINUOUS INTEGRATION/CONTINUOUS DELIVERY PIPELINE ANALYZER

(71) Applicant: SAP SE, Walldorf (DE)

(72) Inventors: Nir Koren, Kfar Saba (IL); Slava Rubejevsky, Ashdod (IL); Liran Yehudar, Kiryat Ono (IL); Avichai Geldzahler, Ra'anana (IL)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 19/202,515

(22) Filed: May 8, 2025

(65) Prior Publication Data

US 2025/0278327 A1 Sep. 4, 2025

Related U.S. Application Data

(63) Continuation of application No. 18/376,251, filed on Oct. 3, 2023, now Pat. No. 12,321,222.

(51) Int. Cl.
*G06F 11/00* (2006.01)
*G06F 11/07* (2006.01)

(52) U.S. Cl.
CPC .................................. *G06F 11/079* (2013.01)

(58) Field of Classification Search
CPC ...... G06F 11/079; G06F 11/0793; G06F 8/65; G06F 8/656; G06F 8/658
See application file for complete search history.

(56) References Cited

U.S. PATENT DOCUMENTS 12,321,222 B2 * 6/2025 Koren ................. G06F 11/0778
2016/0203035 A1 7/2016 Tran
2019/0065357 A1 * 2/2019 Brafman ............ G05B 23/0275
2024/0193032 A1 6/2024 Tang et al.
2024/0220350 A1 * 7/2024 Ni ......................... G06F 11/079
2024/0345904 A1 * 10/2024 Teja ..................... G06F 11/0793
2025/0045148 A1 * 2/2025 Acharya ............. G06F 11/0766
2025/0138931 A1 5/2025 Koren et al.

OTHER PUBLICATIONS

"U.S. Appl. No. 18 376,251, Notice of Allowance mailed Jan. 17, 2025", 9 pgs.
"U.S. Appl. No. 18 376,251, Corrected Notice of Allowability mailed Jan. 29, 2025", 6 pgs.
"U.S. Appl. No. 18 376,251, PTO Response to Rule 312 Communication mailed May 14, 2025", 2 pgs.

* cited by examiner

*Primary Examiner* — Marc Duncan
(74) *Attorney, Agent, or Firm* — SCHWEGMAN LUNDBERG & WOESSNER, P.A.

(57) ABSTRACT

In an example embodiment, a root cause of a CI/CD pipeline is identified automatically from event logs of the CI/CD pipeline. A solution is then suggested automatically using an artificial intelligence analysis. More particularly, the identified root cause (e.g., error) and contextual information about the system and/or application being examined may be passed to an AI engine to predict one or more solutions to the root case.

20 Claims, 6 Drawing Sheets

CONTINUOUS INTEGRATION/CONTINUOUS DELIVERY PIPELINE ANALYZER

CROSS-REFERENCE TO RELATED APPLICATIONS

This application is a continuation of prior application Ser. No. 18/376,251, filed on Oct. 3, 2023, which is incorporated by reference herein in its entirety.

TECHNICAL FIELD

This document generally relates to systems and methods for use with continuous integration (CI) components. More specifically, this document relates to a pipeline analyzer.

BACKGROUND

Continuous integration (CI) in software development is part of quality control for coding computer software. It acts to reduce the time needed to get a particular functionality working while at the same time improving quality. This is accomplished by providing instant feedback of how new code affects an overall solution or system.

A CI system watches a code repository for changes to source code, as provided by source control management (SCM) components. As soon as a change to a code base is committed, the CI system builds the code and runs one or more quality tests.

With the rise in popularity of cloud computing and software-as-a-service (Saas), code changes, when accepted, are typically available to customers immediately. This is known as Continuous Delivery (CD). This is in stark contrast to the past, where a product lifecycle included an extensive testing period (typically both alpha and beta-testing) before being made available to customers.

BRIEF DESCRIPTION OF DRAWINGS

The present disclosure is illustrated by way of example and not limitation in the figures of the accompanying drawings, in which like references indicate similar elements and in which.

DETAILED DESCRIPTION

Figure 1:
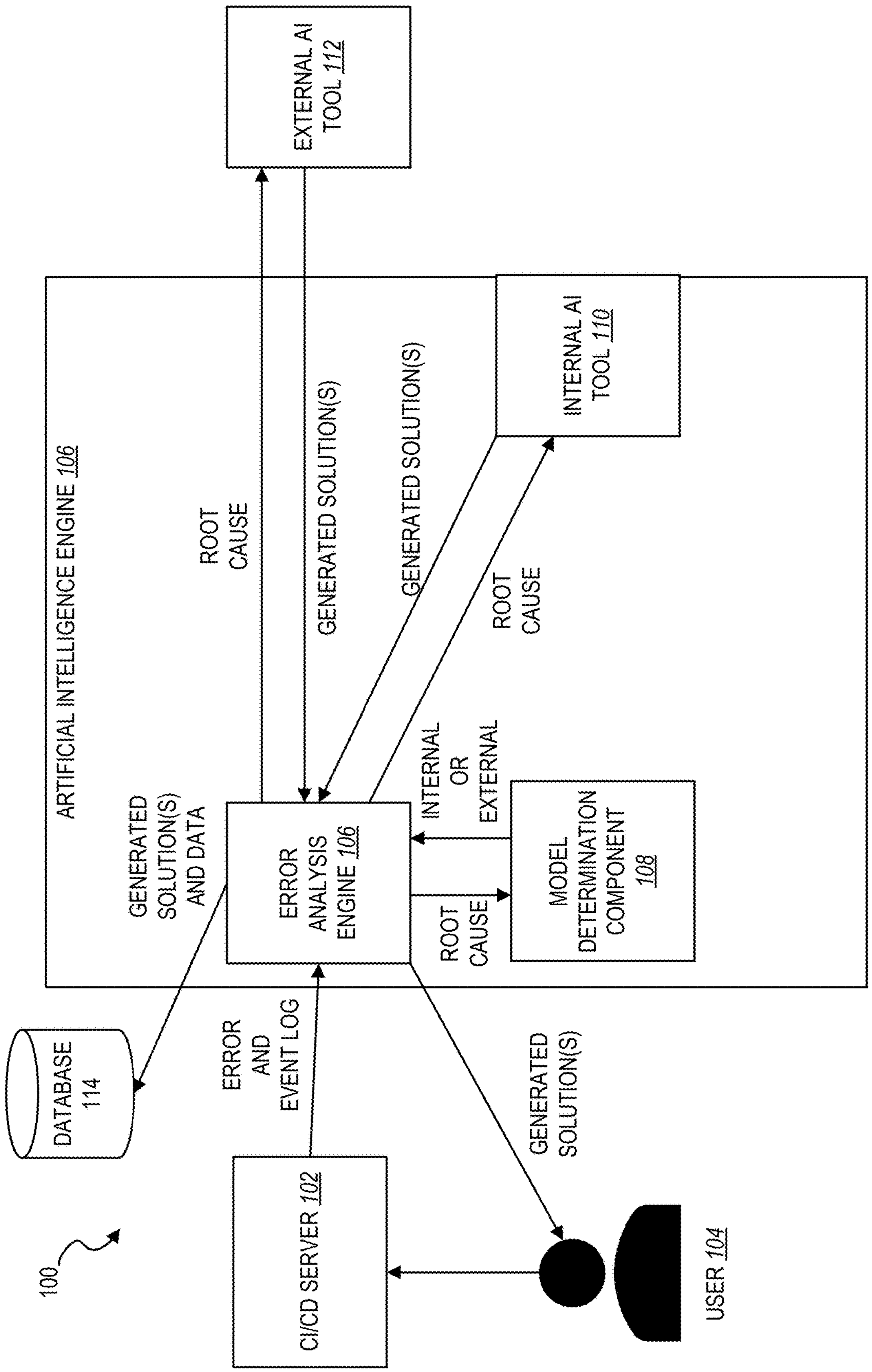
FIG. 1 is a block diagram illustrating a system, in accordance with an example embodiment.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

A CI/CD pipeline is the automation that enables incremental code changes from developers' desktops to be delivered quickly and reliably to production. Various microservices connect to the CI/CD pipeline to perform CI and/or CD functionality. In some cases, however, the volume of simultaneous microservice is so great that it becomes difficult to manage. When an issue arises within the pipeline, such as a compiling error on some code being compiled, it can be difficult to identify the root cause of the issue. Furthermore, even once the root cause is identified, the user must typically determine a solution on his or her own.

In an example embodiment, a root cause of a CI/CD pipeline is identified automatically from event logs of the CI/CD pipeline. A solution is then suggested automatically using an artificial intelligence analysis. M ore particularly, the identified root cause (e.g., error) and contextual information about the system and/or application being examined may be passed to an AI engine to predict one or more solutions to the root case.

It should be noted that the artificial intelligence analysis used may be either an internal or an external AI tool. An external AI tool is an AI tool that is operated by a third party (not the entity running the CI/CD pipeline). External AI tools, such as a Large Language Model (LLM), are often trained on very large training data sets, and thus tend to be more reliable when it comes to performing AI tasks generally than an internal AI tool, which may be trained on less data. That being said, however, external AI tools are inferior to internal AI tools in some use cases. First of all, there may be certain instances where, for security or privacy reasons, the use of an external AI tool may not be desirable. This may be the case if, for example, the error or the contextual information about the system and/or application being examined is confidential in nature, such as where the context indicates that an error has occurred in a line of code continuing a particular uniform resource locator (URL), and that URL is for internal use only. Second of all, there may be certain instances where the external AI tool is likely to not be as reliable to predict an accurate solution as an internal AI tool, such as where the error is contained in code in a computer language that is proprietary to the entity running the CI/CD pipeline.

In an example embodiment, a specialized component is introduced that dynamically determines whether a particular root cause should be sent to an internal or an external AI component for solution suggestions. This allows the solution suggestion process to be automatic, without requiring human intervention to get from code creation to an error solution suggestion.

In a further example embodiment, the solution may further include a component that automatically performs the suggested fix (after approval by a user), freeing up that additional task from the need of being performed by a human.

FIG. 1 is a block diagram illustrating a system 100, in accordance with an example embodiment. A CI/CD server 102 in the system 100 operates a CI/CD pipeline where users, such as user 104, can develop and distribute software and software updates. It also tracks events that occur in the CI/CD pipeline in an event log for each software project.

The CI/CD server 102 identifies when a failure occurs in this CI/CD pipeline, but does not actually know the root cause of the failure. When such a failure occurs, the CI/CD server 102 sends an identification of the error and the corresponding event log for the software project in question to an error analysis engine 106 in an artificial intelligence component 106. The error analysis engine 106 analyzes the error and the event log for the corresponding software project and identifies the root cause of the error.

In an example embodiment, the error analysis engine 106 is implemented as a first machine learning model trained by a first machine learning algorithm to identify root causes from error identifications and event logs, as well as contextual information about the application and system in question. For example, a first machine learning model may be trained by any algorithm from among many different potential supervised or unsupervised machine learning algorithms. Examples of supervised learning algorithms include artificial neural networks, Bayesian networks, instance-based learning, support vector machines, linear classifiers, quadratic classifiers, k-nearest neighbor, decision trees, and hidden Markov models.

In an example embodiment, the machine learning algorithm used to train the first machine learning model may iterate among various weights (which are the parameters) that will be multiplied by various input variables and evaluate a loss function at each iteration, until the loss function is minimized, at which stage the weights/parameters for that stage are learned. Specifically, the weights are multiplied by the input variables as part of a weighted sum operation, and the weighted sum operation is used by the loss function.

In some example embodiments, the training of the first machine learning model may take place as a dedicated training phase. In other example embodiments, the machine learning model may be retrained dynamically at runtime by the user providing live feedback (such as indicating that a root cause suggested by the first machine learning model is not accurate (a negative signal) or is accurate [a positive signal]).

In an example embodiment, the first machine learning algorithm may apply some sort of clustering technique (such as k-nearest neighbor) on the event logs in the training data to determine whether some structure can be found in it that would suggest a root cause of the corresponding underlying error. Errors may also fall into different categories, so different types of analyses can be performed for different categories. These categories may include, for example, functional errors, connectivity errors, testing errors, hardware errors, etc.

Figure 2:
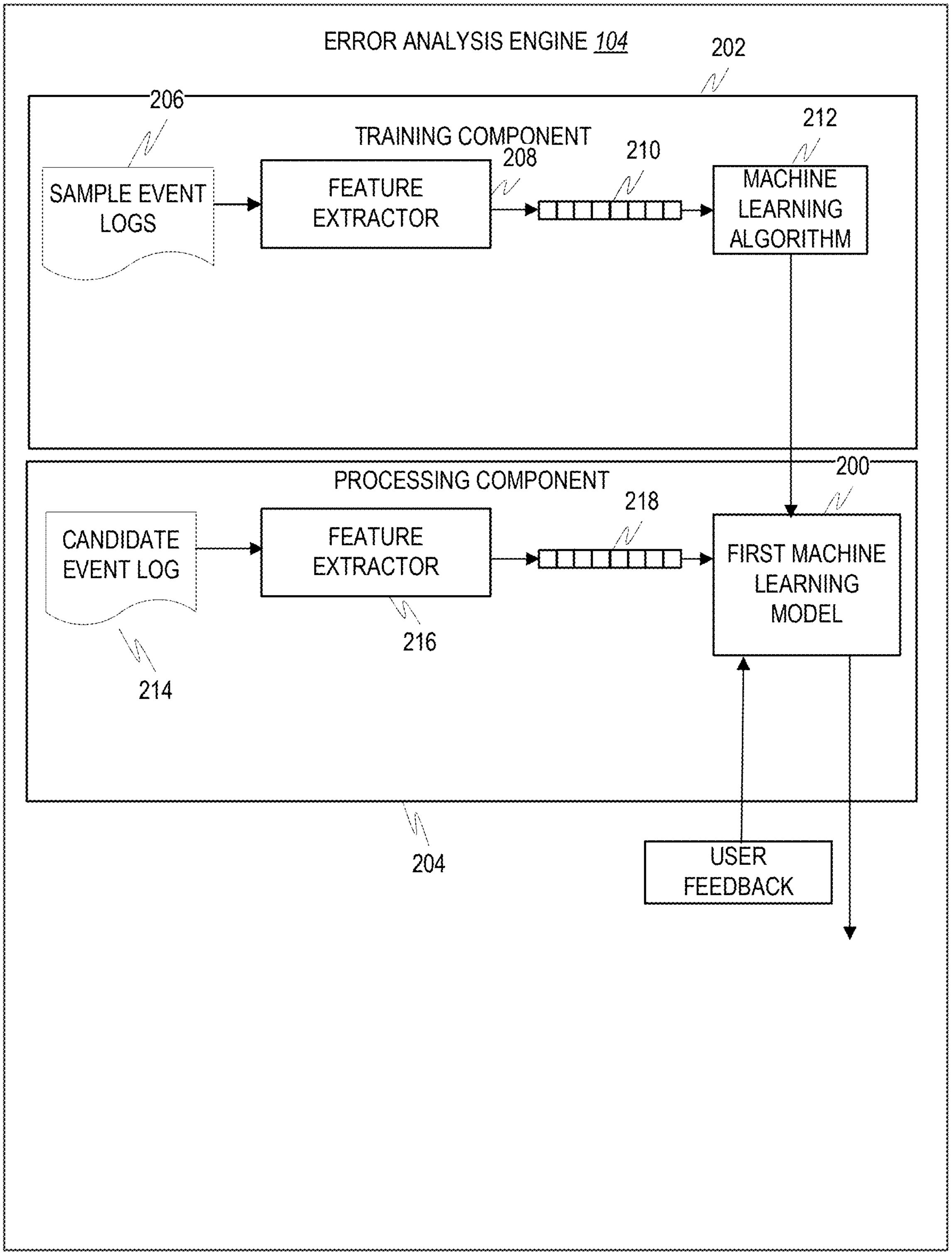
FIG. 2 is a block diagram illustrating an error analysis engine in more detail, in accordance with an example embodiment.

FIG. 2 is a block diagram illustrating an error analysis engine 106 in more detail, in accordance with an example embodiment. The error analysis engine 106 may use machine learning techniques to learn a first machine learning model 200 to predict a root cause of an error.

The error analysis engine 106 may comprise a training component 202 and a processing component 204. It should be noted that in some example embodiments, the training component 202 may actually be located on a separate component than the model determination component 108, and may, in fact, be located on a device that is separate and distinct from the system 100 of claim 1. The training component 202 feeds sample event logs 206 into a feature extractor 208 that extracts one or more features 210 for the sample event logs 206. The sample event logs 206 may be labelled, such as with labels indicating a root cause for each event log or grouping of event log.

A machine learning algorithm 212 produces the first machine learning model 200 using the extracted features 210 along with the labels. In the processing component 204, an event log or event logs from a particular failure can be fed to a feature extractor 216. The feature extractor 216 extracts one or more features 218 from the candidate event log(s) 214. These features 218 are then fed to the first machine learning model 200, which outputs a prediction of a root cause for a given event log or group of event logs.

Once the root cause has been identified, it is time to suggest possible solutions to the root cause. Before such suggestion can be generated, however, it is first determined whether to use an internal AI tool 110 or external AI tool 112 for that purpose. This may be determined using a model determination component 108.

In some example embodiments, the model determination component 108 is implemented as a rule set stored in a rule set database. The rule set may contain different classification rules based on the underlying technology involved. For example, there may be one set of rules for Java technology, another for .NET, another for Python, another for C++.

In some instances these rule sets may be created by humans, but in some example embodiments a second machine learning model is trained by a second machine learning algorithm, and the model determination component 108 is implemented as the second machine learning model.

As with the first machine learning model, the second machine learning model may be trained by any algorithm from among many different potential supervised or unsupervised machine learning algorithms.

The machine learning algorithm used to train the second machine learning model may iterate among various weights (which are the parameters) that will be multiplied by various input variables and evaluate a loss function at each iteration, until the loss function is minimized, at which stage the weights/parameters for that stage are learned. Specifically, the weights are multiplied by the input variables as part of a weighted sum operation, and the weighted sum operation is used by the loss function.

In some example embodiments, the training of the first machine learning model may take place as a dedicated training phase. In other example embodiments, the machine learning model may be retrained dynamically at runtime by the user providing live feedback (such as indicating that the choice of using either the internal AI tool 110 or the external AI tool 112 suggested by the second machine learning model is not accurate (a negative signal) or is accurate [a positive signal]).

In an example embodiment, regardless of whether it is human trained or machine learned, the rule set looks for sensitive or confidential data in the event log and/or error and at least partially bases its decision on the presence or lack of presence of that sensitive or confidential information. Additional factors may include whether the technology involved is proprietary or otherwise internal.

Figure 3:
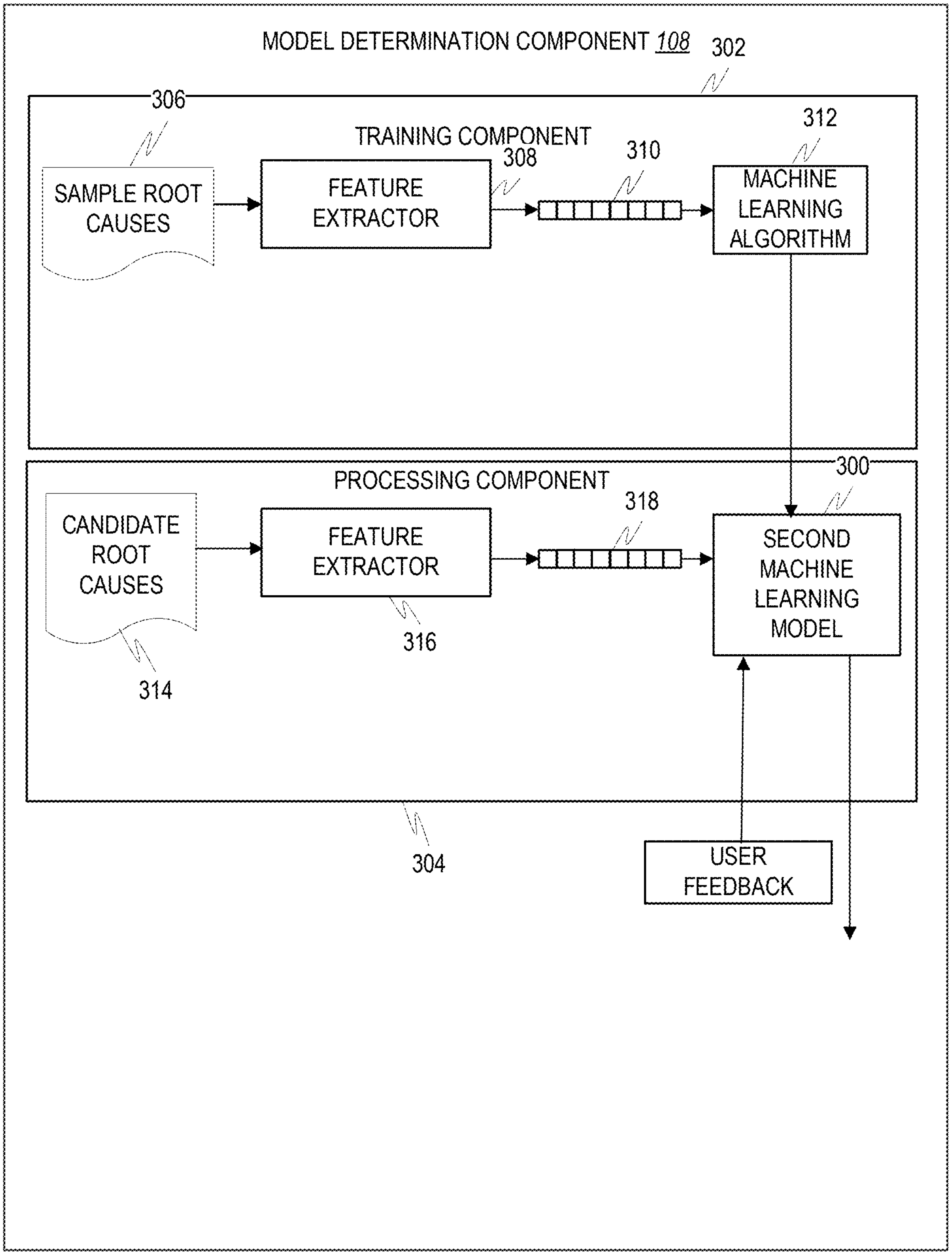
FIG. 3 is a block diagram illustrating a model determination component in more detail.

FIG. 3 is a block diagram illustrating a model determination component 108 in more detail.

The model determination component 108 may comprise a training component 302 and a processing component 304. It should be noted that in some example embodiments, the training component 302 may actually be located on a separate component than the model determination component 108, and may, in fact, be located on a device that is separate and distinct from the system 100 of claim 1. The training component 302 feeds sample root causes 306 into a feature extractor 308 that extracts one or more features 310 for the sample root causes 306. The sample root causes 306 may be labelled, such as with labels indicating a decision of an internal or external AI tool for each sample root cause.

A machine learning algorithm 312 produces the second machine learning model 300 using the extracted features 310 along with the labels. In the processing component 304, a root cause 314 from a particular failure can be fed to a feature extractor 316. The feature extractor 316 extracts one or more features 318 from the root cause 314. These features 318 are then fed to the second machine learning model 300, which outputs a prediction of a decision of either an internal or external AI tool to utilize.

Once the decision has been made as to whether to use the internal AI tool 110 or external AI tool 112, the error and event log are sent to the corresponding AI tool.

The external AI tool 112 is trained based on data that is not unique to the entity operating the CI/CD server 102, but the internal AI tool is trained based on data that is unique to the entity operating the CI/CD server 102.

In an example embodiment, the external AI tool 112 may utilize generative artificial intelligence (GAI) using a Large Language Model (LLM). An LLM is an AI system that has been trained on an extensive dataset to understand and generate human language. These models are designed to process and comprehend natural language in a way that allows them to answer questions, engage in conversations, generate text, and perform various language-related tasks.

A GAI model may be implemented as a generative pre-trained transformer (GPT) model or a bidirectional encoder. A GPT model is a type of machine learning model that uses a transformer architecture, which is a type of deep neural network that excels at processing sequential data, such as natural language.

A bidirectional encoder is a type of neural network architecture in which the input sequence is processed in two directions: forward and backward. The forward direction starts at the beginning of the sequence and processes the input one token at a time, while the backward direction starts at the end of the sequence and processes the input in reverse order.

By processing the input sequence in both directions, bidirectional encoders can capture more contextual information and dependencies between words, leading to better performance.

The bidirectional encoder may be implemented as a Bidirectional Long Short-Term Memory (BiLSTM) or BERT (Bidirectional Encoder Representations from Transformers) model.

Each direction has its own hidden state, and the final output is a combination of the two hidden states.

Long Short-Term Memories (LSTMs) are a type of recurrent neural network (RNN) that are designed to overcome the vanishing gradient problem in traditional RNNs, which can make it difficult to learn long-term dependencies in sequential data.

LSTMs include a cell state, which serves as a memory that stores information over time. The cell state is controlled by three gates: the input gate, the forget gate, and the output gate. The input gate determines how much new information is added to the cell state, while the forget gate decides how much old information is discarded. The output gate determines how much of the cell state is used to compute the output. Each gate is controlled by a sigmoid activation function, which outputs a value between 0 and 1 that determines the amount of information that passes through the gate.

In BiLSTM, there is a separate LSTM for the forward direction and the backward direction. At each time step, the forward and backward LSTM cells receive the current input token and the hidden state from the previous time step. The forward LSTM processes the input tokens from left to right, while the backward LSTM processes them from right to left.

The output of each LSTM cell at each time step is a combination of the input token and the previous hidden state, which allows the model to capture both short-term and long-term dependencies between the input tokens.

BERT applies bidirectional training of a model known as a transformer to language modelling. This is in contrast to prior art solutions that looked at a text sequence either from left to right or combined left to right and right to left. A bidirectionally trained language model has a deeper sense of language context and flow than single-direction language models.

More specifically, the transformer encoder reads the entire sequence of information at once, and thus is considered to be bidirectional (although one could argue that it is, in reality, non-directional). This characteristic allows the model to learn the context of a piece of information based on all of its surroundings.

In other example embodiments, a generative adversarial network (GAN) embodiment may be used. GAN is a supervised machine learning model that has two sub-models: a generator model that is trained to generate new examples, and a discriminator model that tries to classify examples as either real or generated. The two models are trained together in an adversarial manner (using a zero sum game according to game theory), until the discriminator model is fooled roughly half the time, which means that the generator model is generating plausible examples.

The generator model takes a fixed-length random vector as input and generates a sample in the domain in question. The vector is drawn randomly from a Gaussian distribution, and the vector is used to seed the generative process. After training, points in this multidimensional vector space will correspond to points in the problem domain, forming a compressed representation of the data distribution. This vector space is referred to as a latent space, or a vector space comprised of latent variables. Latent variables, or hidden variables, are those variables that are important for a domain but are not directly observable.

The discriminator model takes an example from the domain as input (real or generated) and predicts a binary class label of real or fake (generated).

Generative modeling is an unsupervised learning problem, although a clever property of the GAN architecture is that the training of the generative model is framed as a supervised learning problem.

The two models, the generator and discriminator, are trained together. The generator generates a batch of samples, and these, along with real examples from the domain, are provided to the discriminator and classified as real or fake.

The discriminator is then updated to get better at discriminating real and fake samples in the next round, and importantly, the generator is updated based on how well, or not, the generated samples fooled the discriminator.

In another example embodiment, the GAI model is a Variational AutoEncoders (VAEs) model. VAEs comprise an encoder network that compresses the input data into a lower-dimensional representation, called a latent code, and a decoder network that generates new data from the latent code. In either case, the GAI model contains a generative classifier, which can be implemented as, for example, a naïve Bayes classifier.

The present solution works with any type of GAI model, although an implementation that specifically is used with a GPT model will be described.

The internal AI tool 110 may also utilize an LLM model, and in some cases the LLM model used by the internal AI tool 110 may be an extension or fine-tuning of the same LLM model used by the external AI tool 112. In that respect, the external portion of the LLM model is trained using external data and the extension or fine-tuning portion of the LLM model is trained using internal data. The prior discussion of the internal AI tool 110 being trained using only internal data shall be read broadly enough to encompass this scenario.

One either the internal AI tool 110 or the external AI tool 112 generates the list of one or more suggested solutions to the root case. That list can be communicated to the error analysis engine 106, which can then communicate it to the relevant users, such as user 104. This communication may include, for example, notifying the user 104 of the reasons for the failure and workable solutions. The error analysis engine 106 can also send reports to a database 114 for later analysis and tracking, such as by development operations teams, infrastructure teams, information technology teams, etc.

In a further example embodiment, the fix itself can be automatically initiated by the error analysis engine 106 creating an open merge request with a code repository service where the code is published, such as GitHub.

In some example embodiment, the LLM is trained generally to generate text based on a natural language query and contextual information passed to it. As described above, the LLM may be implemented as a generative pre-trained transformer (GPT) model or a bidirectional encoder, but in example embodiments the LLM, regardless of implementation, is trained to generate text regardless of the purpose of the text generation. While contextual information may be passed to the LLM to aid in the generation of text that is relevant to the specific purpose being sought (or environment in which it is being sought), the model itself is trained using training data across many different purposes and environments.

In other example embodiments, however, while the LLM itself is still trained in a general manner using training data across many different purposes and environments, a specific instance of the LLM is fine-tuned to operate more effectively specifically for the purpose and environment of generating code in a declarative language format. This re-trains the LLM to be a special-purpose LLM for declarative language format code generation.

The fine tuning may include obtaining an LLM trained generally (here denoted as a "general LLM", and then rerunning a machine learning algorithm that was used to train the general LLM using purpose and environment/specific data. In this case, the training data includes data models, such as CAP data models. The machine learning model then retrains the general LLM to produce a special-purpose LLM.

The retraining may include the following operations. First, the training data is cleaned and preprocessed to remove any irrelevant or sensitive information. It is then split into smaller chunks or sequences that the model can process effectively. The model is fine-tuned using a process called unsupervised learning. The primary objective during training is to predict the next word in a sequence given the previous words. This is done using a technique called "masked language modeling" or "cloze task."

The objective of masked language modeling is to predict missing words in a sentence or sequence of words. During the training process, some words in the input text are randomly masked, and the model then predicts the masked words based on the context provided by the surrounding words. To accomplish masked language modeling, various operations are performed: masking, context-based prediction, loss calculation, and finally backpropagation and updating. For masking, in the input text or sequence of words, a certain percentage of words is randomly selected and replaced with a special token. In context-based prediction, the LLM then processes the masked input and uses the context from the surrounding words to predict the masked word. The model considers the relationships between words, the grammar of the language, and the overall semantics to make an informed guess about the masked word.

In loss calculation, the model's prediction for the masked word is compared to the actual word (the original word that was masked) using a loss function, such as cross-entropy loss. The loss function quantifies the difference between the predicted probability distribution over words and the true distribution (one-hot encoded vector representing the actual word). Finally, for backpropagation and Update, the loss is backpropagated through the model, and the model's parameters (weights and biases) are updated to minimize the loss and improve the model's ability to predict masked words accurately.

As far as cloze task, this involves the model being presented with a passage of text with certain words or phrases removed, and the model is challenged to fill in the missing words based on the context provided.

Returning now to the retraining process, the model is exposed to the preprocessed data and learns from it iteratively over multiple training iterations. During each iteration, the model adjusts its internal parameters (weights and biases) to minimize the prediction errors and improve its performance. The training process involves optimization algorithms like Stochastic Gradient Descent (SGD) or its variants, which fine-tune the model's parameters to make it better at predicting the next word in a sequence.

Hyperparameter Tuning can then be performed where various hyperparameters (e.g., learning rate, batch size, number of layers) are tuned to find the best configuration that results in optimal performance and generalization.

Figure 4:
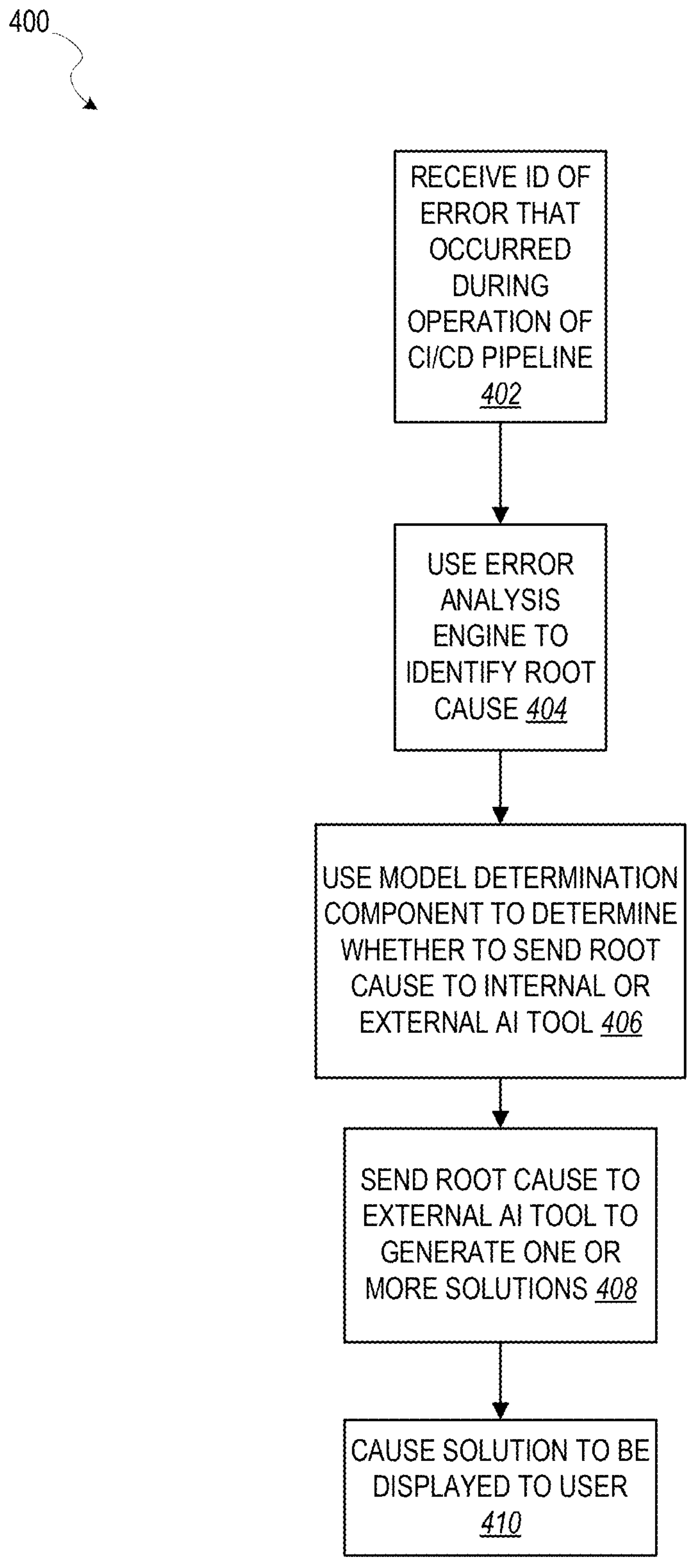
FIG. 4 is a flow diagram illustrating a method, in accordance with an example embodiment.

FIG. 4 is a flow diagram illustrating a method 400, in accordance with an example embodiment. At operation 402, an identification of an error that occurred during operation of the CI/CD pipeline on first software code created by a first user and an event log containing events occurring during the operation are received from a continuous integration/continuous deployment (CI/CD) pipeline. At operation 404, an error analysis engine is used on the identification of the error and the event log to identify a root cause of the error.

At operation 406, a model determination component is used to determine whether to utilize an internal artificial intelligence (AI) tool or an external AI tool, the internal AI tool operated by an entity operating the CI/CD pipeline.

At operation 408, in response to a determination that the external AI tool should be used, the root cause of the error is passed to the external AI tool, the external AI tool being a Generative Artificial Intelligence (GAI) model that generates one or more solutions to the root cause of the error. At operation 410 the one or more solutions are caused to be displayed to the first user in a user interface.

In view of the disclosure above, various examples are set forth below. It should be noted that one or more features of an example, taken in isolation or combination, should be considered within the disclosure of this application.

Example 1. A system comprising:

at least one hardware processor; and a computer-readable medium storing instructions that, when executed by the at least one hardware processor, cause the at least one hardware processor to perform operations comprising:

receiving, from a continuous integration/continuous deployment (CI/CD) pipeline, an identification of an error that occurred during operation of the CI/CD pipeline on first software code created by a first user and an event log containing events occurring during the operation;

using an error analysis engine on the identification of the error and the event log to identify a root cause of the error;

using a model determination component to determine whether to utilize an internal artificial intelligence (AI) tool or an external AI tool, the internal AI tool operated by an entity operating the CI/CD pipeline, the external AI tool operated by an entity other than the entity operating the CI/CD pipeline;

in response to a determination that the external AI tool should be used, passing the root cause of the error to the external AI tool, the external AI being a Generative Artificial Intelligence (GAI) model that generates one or more solutions to the root cause of the error; and causing the one or more solutions to be displayed to the first user in a user interface.

Example 2 The system of Example 1, wherein the passing further includes contextual information regarding the error to the GAI model.

Example 3. The system of Example 2, wherein the contextual information includes an identification of the language in which the first software code was generated.

Example 4. The system of any of Examples 1-3, wherein the error analysis engine is a first machine learning model trained by a first machine learning algorithm.

Example 5. The system of Example 4, wherein the first machine learning model is trained by extracting features from sample labeled event logs and passing the features and labels from the sample labeled event logs to the first machine learning algorithm.

Example 6. The system of Example 5, wherein the first machine learning model is retrained based on input by the user in response to the causing of the display.

Example 7. The system of any of Examples 1-6, wherein the model determination component is a second machine learning model trained by a second machine learning algorithm.

Example 8. A method comprising:

receiving, from a continuous integration/continuous deployment (CI/CD) pipeline, an identification of an error that occurred during operation of the CI/CD pipeline on first software code created by a first user and an event log containing events occurring during the operation;

using an error analysis engine on the identification of the error and the event log to identify a root cause of the error;

using a model determination component to determine whether to utilize an internal artificial intelligence (AI) tool or an external AI tool, the internal AI tool operated by an entity operating the CI/CD pipeline, the external AI tool operated by an entity other than the entity operating the CI/CD pipeline;

in response to a determination that the external AI tool should be used, passing the root cause of the error to the external AI tool, the external AI being a Generative Artificial Intelligence (GAI) model that generates one or more solutions to the root cause of the error; and causing the one or more solutions to be displayed to the first user in a user interface.

Example 9 The method of Example 8, wherein the passing further includes contextual information regarding the error to the GAI model.

Example 10. The method of Example 9, wherein the contextual information includes an identification of the language in which the first software code was generated.

Example 11. The method of any of Examples 8-10, wherein the error analysis engine is a first machine learning model trained by a first machine learning algorithm.

Example 12. The method of Example 11, wherein the first machine learning model is trained by extracting features from sample labeled event logs and passing the features and labels from the sample labeled event logs to the first machine learning algorithm.

Example 13. The method of Example 12, wherein the first machine learning model is retrained based on input by the user in response to the causing of the display.

Example 14. The method of any of Examples 8-13, wherein the model determination component is a second machine learning model trained by a second machine learning algorithm.

Example 15. A non-transitory machine-readable medium storing instructions which, when executed by one or more processors, cause the one or more processors to perform operations comprising:

receiving, from a continuous integration/continuous deployment (CI/CD) pipeline, an identification of an error that occurred during operation of the CI/CD pipeline on first software code created by a first user and an event log containing events occurring during the operation;

using an error analysis engine on the identification of the error and the event log to identify a root cause of the error;

using a model determination component to determine whether to utilize an internal artificial intelligence (AI) tool or an external AI tool, the internal AI tool operated by an entity operating the CI/CD pipeline, the external AI tool operated by an entity other than the entity operating the CI/CD pipeline;

in response to a determination that the external AI tool should be used, passing the root cause of the error to the external AI tool, the external AI being a Generative Artificial Intelligence (GAI) model that generates one or more solutions to the root cause of the error; and causing the one or more solutions to be displayed to the first user in a user interface.

Example 16 The non-transitory machine-readable medium of Example 15, wherein the passing further includes contextual information regarding the error to the GAI model.

Example 17. The non-transitory machine-readable medium of Example 17, wherein the contextual information includes an identification of the language in which the first software code was generated.

Example 18. The non-transitory machine-readable medium of any of Examples 15-17, wherein the error analysis engine is a first machine learning model trained by a first machine learning algorithm.

Example 19. The non-transitory machine-readable medium of Example 18, wherein the first machine learning model is trained by extracting features from sample labeled event logs and passing the features and labels from the sample labeled event logs to the first machine learning algorithm.

Example 20. The non-transitory machine-readable medium of Example 19, wherein the first machine learning model is retrained based on input by the user in response to the causing of the display.

Figure 5:
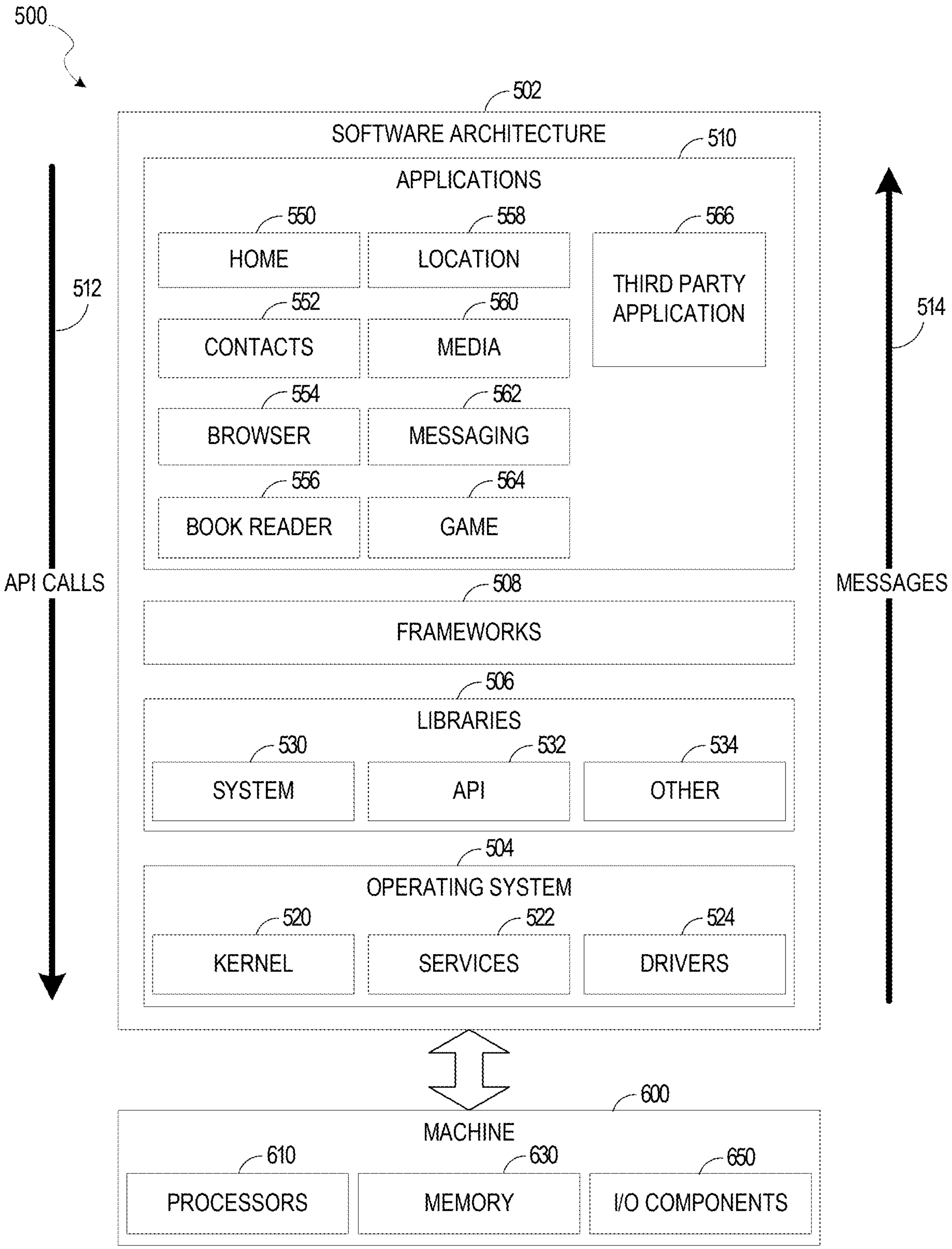
FIG. 5 is a block diagram illustrating a representative software architecture, which may be used in conjunction with various hardware architectures herein described.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke API calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionalities. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various GUI functions, high-level resource management, high-level location services, and so forth. The frameworks 508 can provide a broad spectrum of other A PIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
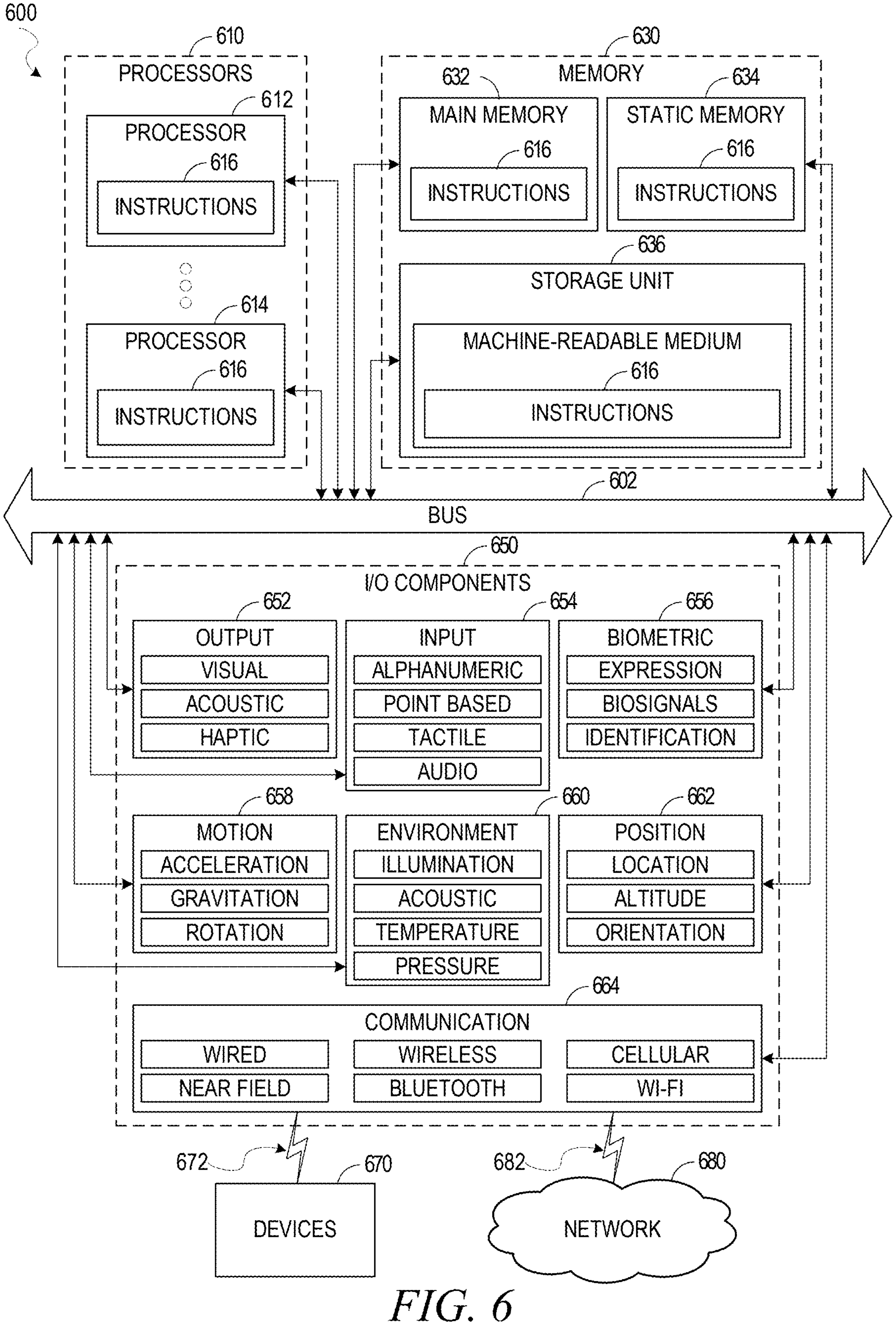
FIG. 6 is a block diagram illustrating components of a machine, according to some example embodiments, able to read instructions from a machine-readable medium (e.g., a machine-readable storage medium) and perform any one or more of the methodologies discussed herein.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the method 400 of FIG. 4. Additionally, or alternatively, the instructions 616 may implement FIGS. 1-4 and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor 612), multiple processors 612, 614 with a single core, multiple processors 612, 614 with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., coupled via a USB).

Moreover, the communication components 664 may detect identifiers or include components operable to detect identifiers. For example, the communication components 664 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

The various memories (e.g., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., HTTP). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:

at least one hardware processor;

a computer-readable medium storing instructions that, when executed by the at least one hardware processor, cause the at least one hardware processor to perform operations comprising:

receiving, from a continuous integration/continuous deployment (CI/CD) pipeline, an identification of an event that occurred during operation of the CI/CD pipeline on first software code created by a first user and an event log containing events occurring during the operation;

using an event analysis engine on the identification of the event and the event log to identify a root cause of the event;

in response to a determination that an external AI tool should be used, passing the root cause to the external AI tool, the external AI tool being a Generative Artificial Intelligence (GAI) model that generates one or more solutions to the root cause of the event; and automatically initiating a fix corresponding to at least one of the one or more solutions by creating an open merge request with a code repository service where the first software code is published.

2. The system of claim 1, wherein the passing further includes contextual information regarding the event to the GAI model.

3. The system of claim 2, wherein the contextual information includes an identification of a language in which the first software code was generated.

4. The system of claim 1, wherein the event analysis engine is a first machine learning model trained by a first machine learning algorithm.

5. The system of claim 4, wherein the first machine learning model is trained by extracting features from sample labeled event logs and passing the features and labels from the sample labeled event logs to the first machine learning algorithm.

6. The system of claim 5, wherein the first machine learning model is retrained based on input by the first user.

7. The system of claim 1, wherein the operations further comprise using a second machine learning model trained by a second machine learning algorithm to determine whether to utilize an internal AI tool or an external AI tool.

8. A method comprising:

receiving, from a continuous integration/continuous deployment (CI/CD) pipeline, an identification of an event that occurred during operation of the CI/CD pipeline on first software code created by a first user and an event log containing events occurring during the operation;

using an event analysis engine on the identification of the event and the event log to identify a root cause of the event;

in response to a determination that an external AI tool should be used, passing the root cause to the external AI tool, the external AI tool being a Generative Artificial Intelligence (GAI) model that generates one or more solutions to the root cause of the event; and automatically initiating a fix corresponding to at least one of the one or more solutions by creating an open merge request with a code repository service where the first software code is published.

9. The method of claim 8, wherein the passing further includes contextual information regarding the event to the GAI model.

10. The method of claim 9, wherein the contextual information includes an identification of a language in which the first software code was generated.

11. The method of claim 8, wherein the event analysis engine is a first machine learning model trained by a first machine learning algorithm.

12. The method of claim 11, wherein the first machine learning model is trained by extracting features from sample labeled event logs and passing the features and labels from the sample labeled event logs to the first machine learning algorithm.

13. The method of claim 12, wherein the first machine learning model is retrained based on input by the first user.

14. The method of claim 8, further comprising using a second machine learning model trained by a second machine learning algorithm to determine whether to utilize an internal AI tool or an external AI tool.

15. A non-transitory machine-readable medium storing instructions which, when executed by one or more processors, cause the one or more processors to perform operations comprising:

receiving, from a continuous integration/continuous deployment (CI/CD) pipeline, an identification of an event that occurred during operation of the CI/CD pipeline on first software code created by a first user and an event log containing events occurring during the operation;

using an event analysis engine on the identification of the event and the event log to identify a root cause of the event;

in response to a determination that an external AI tool should be used, passing the root cause to the external AI tool, the external AI tool being a Generative Artificial Intelligence (GAI) model that generates one or more solutions to the root cause of the event; and automatically initiating a fix corresponding to at least one of the one or more solutions by creating an open merge request with a code repository service where the first software code is published.

16. The non-transitory machine-readable medium of claim 15, wherein the passing further includes contextual information regarding the event to the GAI model.

17. The non-transitory machine-readable medium of claim 16, wherein the contextual information includes an identification of a language in which the first software code was generated.

18. The non-transitory machine-readable medium of claim 15, wherein the event analysis engine is a first machine learning model trained by a first machine learning algorithm.

19. The non-transitory machine-readable medium of claim 18, wherein the first machine learning model is trained by extracting features from sample labeled event logs and passing the features and labels from the sample labeled event logs to the first machine learning algorithm.

20. The non-transitory machine-readable medium of claim 19, wherein the first machine learning model is retrained based on input by the first user.

* * * * *